Dec. 13, 1955 W. L. LEYDE ET AL 2,727,144
SAWTOOTH GENERATOR
Filed Jan. 12, 1952
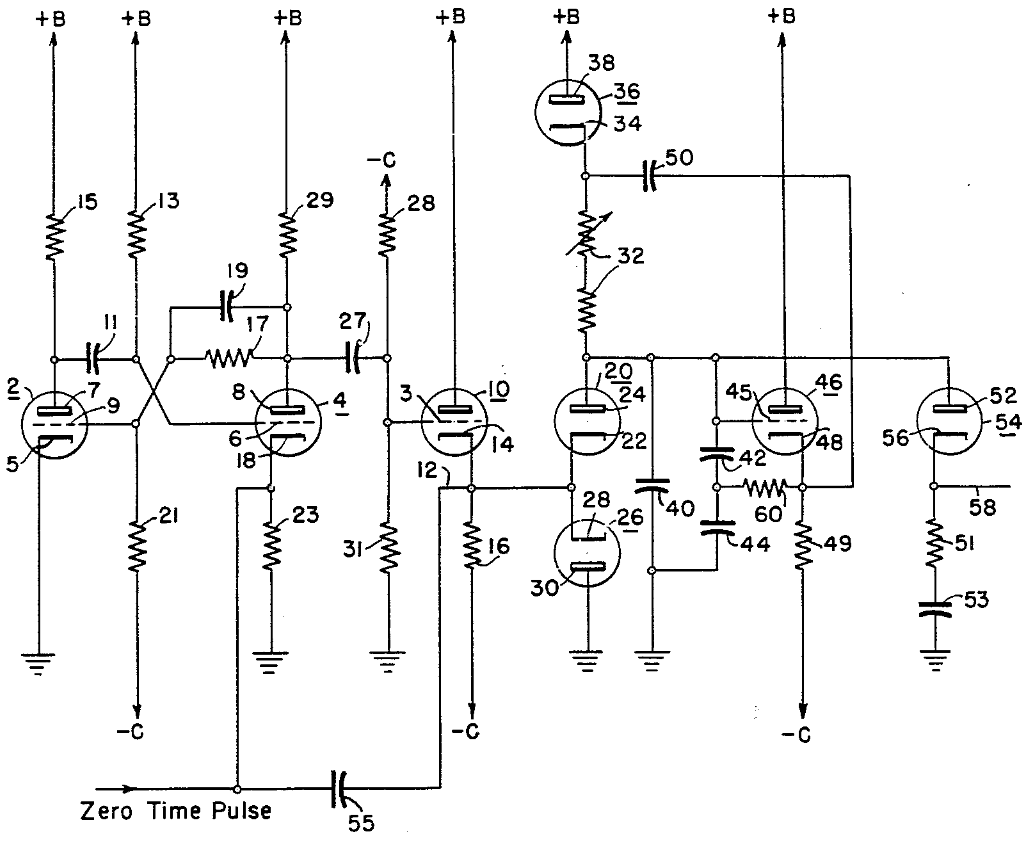
WITNESSES:
E. A. McCloskey
M. W. Dodd
INVENTORS
Warren L. Leyde
and David R. Houston.
BY
F. E. Browder
ATTORNEY

United States Patent Office 2,727,144

Patented Dec. 13, 1955

2,727,144

SAWTOOTH GENERATOR

Warren L. Leyde, Bothell, Wash., and David R. Houston, Harundale, Md., assignors to Westinghouse Electric Corporation, East Pittsburgh, Pa., a corporation of Pennsylvania Application January 12, 1952, Serial No. 266,168

10 Claims. (Cl. 250—27)

Our invention relates to an electronic control circuit and more particularly to a sawtooth wave generator.

In some types of radar apparatus, the range of an object is converted to a level of potential. This is usually accomplished by employment of gating pulses which are applied to a sawtooth wave generator so that the greater the time distance between two successive gating pulses, the greater will be the amplitude of the output pulse. The last gating pulse which marks the end of the range is usually applied to an apparatus such as a grid controlled vacuum tube for cutting off the sawtooth wave when that gating pulse is applied. In the prior art circuits of this type several disadvantages have appeared such as lack of temperature compensation and failure of the sawtooth wave to start exactly at zero volts.

Also conventionally a triode has been used for the introduction of the gating pulse to the sawtooth generator. This arrangement causes non-linearities at the start of the wave.

It is accordingly an object of our invention to provide an improved sawtooth generator.

Another object of our invention is to provide a sawtooth wave generator which is temperature compensated.

Still another object of our invention is to provide a sawtooth wave generator in which the sawtooth wave starts at zero volts.

Still another object of our invention is to provide a sawtooth wave generator circuit of such nature that no irregularities are produced at the start of the wave.

An ancillary object of our invention is to provide a novel and useful electronic circuit.

In accordance with our invention, we provide a first electron discharge tube diode having applied thereto a zero time pulse and a gating pulse. The first vacuum tube diode is connected in a back-to-back relationship with a second vacuum tube diode so that their cathodes are interconnected. The anode of the second tube is connected to ground. By having the two tubes connected in a back-to-back relationship, the sawtooth wave can be caused to start at exactly zero volts. Also by applying the zero time pulse directly to the two interconnected diodes of the sawtooth generator the sawtooth wave is caused to start at exactly zero time. The first diode is connected through a charging resistor and a third diode in series to a source of positive potential. As the first diode increases its contact potential with temperature, the contact potential of the second diode correspondingly increases. The cathodes of the diodes are returned to a negative potential through a resistor of such a value as to allow the second diode to conduct twice as much as the first. This arrangement causes the anode of the first diode to remain at a constant zero potential before the introduction of the range gate regardless of changing temperature. The apparatus thus becomes temperature compensated.

The novel features which we consider characteristic of our invention are set forth with more particularity in the appended claims. The invention, however, with respect to both the organization and the operation thereof, together with other objects and advantages may be best understood from the following description of specific embodiments when read in connection with the accompanying drawing, in which the sole figure is a schematic showing of an apparatus embodying our invention.

In accordance with our invention, we provide a first grid controlled oscillator tube 2 having a cathode 5, an anode 7 and a grid 9 and a second grid controlled oscillator tube 4 having a cathode 18, a grid 6, and an anode 8. The grid 6 of the tube 4 is connected to the anode 7 of tube 2 through a capacitance 11 and through a load resistance 13 to a source of positive potential. The anode of tube 2 is also connected through a load resistance 15 to a source of positive potential. The grid of the first oscillator tube 2 is connected through a resistance 17 and capacitance 19 in parallel to the anode 8 of the second oscillator tube 4 and through a resistance 21 to a source of negative potential. The cathode 5 of the first oscillator tube 2 is connected directly to ground and the cathode 18 of the second oscillator tube 4 is connected through a resistance 23 to ground. The anode 8 of the second oscillator tube 4 is connected through a capacitance 27 and a resistance 25 in series to a source of negative potential and through a load resistance 29 to a source of positive potential. A grid controlled amplifier tube 10 is provided having connections 12 including a capacitance 55 in series therewith for applying a zero time pulse to the cathode 14 of the amplifier tube 10, the cathode 14 of the amplifier tube 10 being also connected through a resistance 16 to a source of negative potential. The grid 3 of the amplifier tube 10 is connected through a resistance 31 to ground and through the capacitance 27 to the anode 8 of tube 4. Connections are also supplied for applying the zero time pulse to the cathode 18 of the second oscillator tube 4.

A first diode 20 having a cathode 22 and an anode 24 is provided in a back-to-back arrangement with a second diode 26 having a cathode 28 and an anode 30, the cathodes of the first and second diodes being interconnected. The cathodes 22, 28 of the first and second diodes 20, 26 are connected directly to the cathode 14 of the first amplifier tube 10. The connection of the first and second diodes 20, 26 to the amplifier tube 10 is thus a cathode follower arrangement. The anode 30 of the second diode 26 is connected to ground. The anode 24 of the first diode 20 is connected through a variable charging resistance 32 to the cathode 34 of a third diode 36. The anode 38 of the third diode 36 is connected to a source of positive potential.

The anode 24 of the first diode 20 is also connected to ground through a primary charging condenser 40 in parallel with two series connected secondary charging condensers 42, 44. Connected to the positive side of the charging condensers 40, 42 is the grid 45 of a second amplifier tube 46. Connected to the cathode 48 of the second amplifier tube 46 in a cathode follower arrangement, and through a condenser 50, is the cathode 34 of the third diode 36. The cathode 48 of the second amplifier tube is also connected through a resistance 49 to a source of negative potential. Also connected to the positive side of the charging condensers 40, 42 is the anode 52 of an output diode 54. The cathode 56 of the output diode 54 is connected through a resistance 51 and capacitance 53 in series to ground, and connected to the cathode 56 in a cathode follower arrangement is an output connection 58 for supplying the resulting pulse to other electronic apparatus.

In the operation of the apparatus shown in the drawing, a series of pulses are produced by the oscillator tubes 2, 4 in response to the zero time pulse applied to the cathode 18 of the second oscillator tube 4. The pulses produced by the oscillator are the range gate pulses and are applied through a cathode follower circuit comprising the cathode 14 of the first amplifier tube 10 to the cathodes 22, 28 of the first and second diodes.

The zero time pulse is also applied directly to the cathodes 22, 28 of the first and second diodes 20, 26. Since the first and second diodes 20, 26 are connected in a back-to-back arrangement, the sawtooth wave starts at almost exactly zero volts and there are substantially no irregularities at the start of the wave. As current flows through the first diode 20 there is no potential built up on the charging condensers 40, 42, 44. However, when the first diode 20 is cut off in response to the zero time pulse, a charge is gradually built up on the charging condensers 40, 42, 44. This, in turn, raises the voltage on the grid 45 of the second amplifier tube 46, which, in turn, raises the voltage on the cathode 48 of the second amplifier tube 46. As the potential of the cathode 48 of the second amplifier tube 46 rises sufficiently high, it causes the third diode 36 to which it is coupled to be cut off. The rise of the potential on the cathode 34 of the third diode 36 is approximately equal at all times to the rise of the potential on the anode 24 of the first diode 20 and the potential across the charging resistors 32 therefore remains constant. This arrangement causes the sawtooth to be linear for the first 70% of the full amplitude. To further correct irregularities in the sawtooth wave, a connection is provided through the second charging condenser 42 and a compensating resistance 60 from the grid 45 of the second amplifier tube 46 to the cathode 48 of that tube, and from a point between the last-mentioned condenser 42 and resistance 60, a connection is provided through the third charging condenser 44 to ground. The compensating resistance 60 provides a second order compensation which causes the sawtooth wave to be linear for about 95% of its full generated amplitude.

It will be noted that in the circuit described herein, full B+ voltage is maintained across the charging resistances 32. Thus, the charging current remains constant in spite of changes in tubes of the circuit.

The first charging condenser 40 has a negative temperature coefficient while the second and third charging condensers 42, 44 have positive temperature coefficients. Thus, as the temperature increases, the change in capacitance of the first charging condenser 40 is counteracted by the change in capacitance of the second and third charging condensers 42, 44. The charging resistors 32 are preferably wire wound so that their resistance remains substantially constant over a wide range of temperatures. The apparatus is thus temperature compensated to a very high degree.

Although we have shown and described specific embodiments of our invention, we are aware that other modifications thereof are possible. Our invention, therefore, is not to be restricted except insofar as is necessitated by the prior art and the spirit of the invention.

We claim as our invention:

1. A sawtooth generator comprising: a first electron discharge device and a second electron discharge device each having a cathode and an anode, the cathode of said first device and the cathode of said second device being connected together, connections for applying a zero time pulse to said cathodes, connections for applying a range gating pulse to said cathodes, a third electron discharge tube having a cathode and an anode, the cathode of said third device being connected through a resistance to the anode of said first discharge device and the anode of said third device being connected to a source of positive potential, a condenser connected between the anode of said first discharge device and the anode of said second device, and an output electron discharge device having a grid connected to the anode of said first device.

2. A sawtooth generator comprising: a first electron discharge device and a second electron discharge device each having a cathode and an anode, the cathode of said first device and the cathode of said second device being connected together, connections for applying a zero time pulse to said cathodes, connections for applying a range gating pulse to said cathodes, a third electron discharge tube having a cathode and an anode, the cathode of said third device being connected through a resistance to the anode of said first discharge device and the anode of said third device being connected to a source of positive potential, a condenser connected between the anode of said first discharge device and the anode of said second device, an output electron discharge device having a grid connected to the anode of said first device, and means connected to the cathode of said third device for supplying a potential thereto which is responsive to the potential across said condenser.

3. A sawtooth generator comprising a first discharge device and a second discharge device each having a cathode and an anode, the cathode of said first device being connected to the cathode of said second device, connections for applying a gate pulse and a zero time pulse to the cathodes of said devices, the anode of said first device being connected to a source of positive potential, the anode of said second device being connected to a ground potential, a condenser connected in parallel with said first and second discharge devices, and output connections connected to said condenser so as to be responsive to the potential thereacross.

4. A sawtooth wave generator comprising a first unidirectional electrical conductor, a second unidirectional electrical conductor connected back-to-back with said first conductor, connections for applying a zero time pulse and a gating pulse to the interconnected elements of said conductors, a capacitance connected in parallel with said first and second conductors, output connections connected to said capacitance and a diode responsive to the potential developed across said output connections for controlling current flow in at least one of said conductors.

5. In combination, a first unidirectional electrical conductor, a second unidirectional electrical conductor connected to said first conductor in a back-to-back relationship, connections for applying pulses to the interconnected elements of said first and said second conductors, a third unidirectional conductor, a resistance, said first conductor being connected through said resistance and said third unidirectional conductor to a source of potential, said third conductor having similar temperature characteristics to said first conductor, a capacitance connected in parallel with said first and said second conductors, and a current control device having a control element connected so as to be responsive to the potential across said capacitance, said control device being connected to the circuit between said resistance and said third conductor so as to control the potential applied to one side of said resistance.

6. A sawtooth wave generator comprising an input electron discharge device having a cathode and an anode, connections for applying a zero time pulse to the cathode of said device, a balancing electron discharge device and a resistance connected in series with said input device, a capacitance connected to by-pass current around said input device, a potential control device connected to said resistance between said resistance and said balancing device and connected to said capacitance so as to be responsive to the potential thereacross, and an output circuit connected to said capacitance so as to be responsive to the charge thereon.

7. A sawtooth wave generator comprising a first unidirectional electrical conductor, a second unidirectional electrical conductor connected back-to-back with said first conductor, connections for applying a zero time pulse and a gating pulse to the interconnected electrodes of said conductors, a capacitance connected between the uncommon electrodes of said first and said second conductors, output connections connected to said capacitance and a diode responsive to the potential across said connections for controlling current flow through at least one of said conductors.

8. A sawtooth generator comprising at least two unidirectional conductors connected back-to-back, connections for applying pulses to the interconnected elements of said conductors, an impedance connected between the uncommon elements of said conductors, output connections connected to said impedance, and a device connected in series with said conductors for controlling current flow in at least one of said conductors.

9. A sawtooth generator comprising a first electron discharge device and a second electron discharge device each having a cathode and an anode, the cathode of said first device being connected to the cathode of said second device, connections for applying a gate pulse and a zero time pulse to the cathodes of said first and second devices, a condenser connected between the anode of said first discharge device and the anode of said second discharge device, and a third discharge device connected in series with said first and second discharge devices and responsive to voltages developed across said condenser for controlling current flow through at least one of said first or second devices.

10. A sawtooth wave generator comprising a first unidirectional electrical conductor, a second unidirectional electrical conductor connected back-to-back with said first conductor, connections for applying a zero time pulse and a gating pulse to the interconnected electrodes of said conductors, an impedance connected between the uncommon electrodes of said first and second conductors, and a device responsive to voltages developed across said impedance and connected in series with said unidirectional conductors for controlling current flow through one of said conductors.

References Cited in the file of this patent

UNITED STATES PATENTS

| | | |
|---|---|---|
| 2,258,732 | Blumlein et al. | Oct. 14, 1941 |
| 2,441,246 | Miller et al. | May 11, 1948 |
| 2,547,987 | Vestal | Apr. 10, 1951 |
| 2,554,391 | Tellier | May 22, 1951 |
| 2,598,370 | Gruen | May 27, 1952 |
| 2,652,488 | Smeltzer | Sept. 15, 1953 |